US012628111B2

(12) United States Patent　　　(10) Patent No.:　　US 12,628,111 B2
Pan et al.　　　　　　　　　　　　(45) Date of Patent:　　　May 12, 2026

(54) TIMING-BASED POSITIONING TECHNIQUES

(71) Applicant: ZTE Corporation, Shenzhen (CN)

(72) Inventors: Yu Pan, Shenzhen (CN); Guozeng Zheng, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 336 days.

(21) Appl. No.: 18/130,525

(22) Filed: Apr. 4, 2023

(65) Prior Publication Data

US 2023/0239831 A1　　　Jul. 27, 2023

Related U.S. Application Data

(63) Continuation of application No. PCT/CN2021/072387, filed on Jan. 18, 2021.

(51) Int. Cl.
　　*H04W 64/00*　　　(2009.01)
　　*H04L 5/00*　　　(2006.01)
　　*H04W 24/10*　　　(2009.01)
(52) U.S. Cl.
　　CPC ........... *H04W 64/00* (2013.01); *H04L 5/0051* (2013.01); *H04W 24/10* (2013.01)
(58) Field of Classification Search
　　None
　　See application file for complete search history.

(56) References Cited

U.S. PATENT DOCUMENTS

| 12,206,610 | B2 * | 1/2025 | Bao | ....................... | H04W 28/24 |
| 12,316,410 | B2 * | 5/2025 | Long | ................... | H04B 17/104 |
| 2004/0046693 | A1 | 3/2004 | Ogino et al. | | |
| 2016/0302165 | A1 | 10/2016 | Da et al. | | |
| 2020/0137607 | A1 * | 4/2020 | Akkarakaran | ........ | G01S 5/0215 |

(Continued)

FOREIGN PATENT DOCUMENTS

CN　　　　102170320 A　　　8/2011

OTHER PUBLICATIONS

Office action in Japanese application No. 2023-521518, dated Jun. 10, 2024, 9 pages (with English translation).

(Continued)

*Primary Examiner* — Adolf Dsouza
(74) *Attorney, Agent, or Firm* — Crowell & Moring LLP

(57)　　　　ABSTRACT

Timing-based positioning methods are performed including measuring and/or reporting timing errors. A communication node determines measurement information that comprises a set of measurement results and a set of timing delays, where the set of measurement results include a first set of time values when positioning signals are sent or received by a processor of the communication node, and where the set of timing delays includes a second set of time values, each of the second set of time values is a difference between when a positioning signal is sent or received by the processor of the communication node and when the positioning signal is respectively transmitted or received by an antenna of the communication node; and transmitting, by the communication node, the set of measurement results and the set of timing delays to a second communication node.

16 Claims, 7 Drawing Sheets

Determining, by a communication node, measurement information that comprises a set of measurement results and a set of timing delays　602

Transmitting, by the communication node, the set of measurement results and the set of timing delays to a second communication node　604

(56) References Cited

U.S. PATENT DOCUMENTS

| 2023/0328682 | A1* | 10/2023 | Keating | ............ | H04W 56/0015 |
| | | | | | 455/456.1 |
| 2023/0354232 | A1* | 11/2023 | Sriram | .............. | H04W 56/0015 |
| 2024/0306016 | A1* | 9/2024 | Kazmi | ................. | H04B 7/0602 |

OTHER PUBLICATIONS

Extended European Search Report issued Sep. 15, 2023 in corresponding European Patent Application No. 21918665.7.
English-language Office Action issued in European Application No. 21918665.7 dated Nov. 10, 2025, (9 pages).

* cited by examiner

602

Determining, by a communication node, measurement information that comprises a set of measurement results and a set of timing delays

604

Transmitting, by the communication node, the set of measurement results and the set of timing delays to a second communication node

TIMING-BASED POSITIONING TECHNIQUES

This application is a continuation application of PCT International Application No. PCT/CN2021/072387, filed with the China National Intellectual Property Administration, PRC on Jan. 18, 2021, which is herein incorporated by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for timing-based positioning methods including measuring and/or reporting timing errors.

An example wireless communication method comprises determining, by a communication node, measurement information that comprises a set of measurement results and a set of timing delays, wherein the set of measurement results include a first set of time values when positioning signals (which may also be known as reference signals) are sent or received by a processor of the communication node, and wherein the set of timing delays includes a second set of time values, each of the second set of time values is a difference between when a positioning signal is sent or received by the processor of the communication node and when the positioning signal is respectively transmitted or received by an antenna of the communication node; and transmitting, by the communication node, the set of measurement results and the set of timing delays to a second communication node.

In some embodiments, the set of timing delays includes a sum of a first part and a second part, the first part is a difference between when a first positioning signal is sent by the processor of the communication node and when the first positioning signal is transmitted by the antenna of the communication node; and the second part is a difference between when a second positioning signal is received by the processor of the communication node and when the second positioning signal is received by the antenna of the communication node. In some embodiments, the set of timing delays are determined during a time duration when transmission or reception of signals are limited to transmission or reception of the positioning signals.

In some embodiments, the method further comprises receiving, by the communication node from the second communication node, a configuration information of time duration, wherein the configuration information comprises any one or more of a length, a periodicity, an offset, an activate or inactivate switch, and a timing advance. In some embodiments, the method further comprises receiving, by the communication node, a list of associated transmission and reception points (TRPs) that transmit signals to a same communication node or that receive signals from the same communication node. In some embodiments, the method further comprises reporting, by the communication node to the second communication node, a list of associated transmission and reception points (TRPs) that transmit signals to a same communication node or that receive signals from the same communication node.

In some embodiments, the list of associated TRPs is received by the communication node in assistance data sent by a location server in a core network. In some embodiments, the communication node performs communication with at least two associated TRPs from the list of associated TRPs by using a same physical transmission channel to transmit signals to or to receive signals from the at least two associated TRPs. In some embodiments, the positioning signals include sounding reference signals (SRSs), positioning reference signals (PRSs), channel state information reference signals (CSI-RSs), phase tracking reference signals (PT-RSs), or tracking reference signals (TRSs), and the set of timing delays are determined using the positioning signals. In some embodiments, the communication node includes a user equipment (UE), and wherein the second communication node includes a location server in a core network, a base station, or a transmission and reception point (TRIP).

Another example wireless communication method comprises determining, by a base station, measurement information that comprises a set of measurement results and a set of timing delays, wherein the set of measurement results include a first set of time values when positioning signals (which may also be known as reference signals) are sent or received by a processor of the base station, and wherein the set of timing delays includes a second set of time values, each of the second set of time values is a difference between when a positioning signal is sent or received by the processor of the base station and when the positioning signal is respectively transmitted or received by an antenna of the base station; and transmitting, by the base station, the set of measurement results and the set of timing delays to a communication node.

In some embodiments, the set of timing delays includes a sum of a first part and a second part, the first part is a difference between when a first positioning signal is sent by the processor of the base station and when the first positioning signal is transmitted by the antenna of the base station, and the second part is a difference between when a second positioning signal is received by the processor of the base station and when the second positioning signal is received by the antenna of the base station. In some embodiments, the set of timing delays includes a difference of a first part and a second part, the first part is a difference between when a first positioning signal is sent by the processor of the base station and when the first positioning signal is sent by the antenna of the base station; and the second part is a difference between when a second positioning signal is sent by a processor of a second base station and when the second positioning signal is sent by an antenna of the second base station.

In some embodiments, the set of timing delays includes a difference of a first part and a second part, the first part is a difference between when a first positioning signal is received by the processor of the base station and when the first positioning signal is received by the antenna of the base station; and the second part is a difference between when a second positioning signal is received by a processor of a second base station and when the second positioning signal is received by an antenna of the second base station. In some embodiments, the set of timing delays are determined during a time duration when transmission or reception of signals are limited to transmission or reception of the positioning signals.

In some embodiments, the method further comprises transmitting, by the base station to the communication node, a list of associated transmission and reception points (TRPs) that transmit signals to a same communication node or that receive signals from the same communication node. In some embodiments, the list of associated TRPs is transmitted in assistance data sent by a location server in a core network. In some embodiments, the method further comprises receiving, by the base station from a communication node or a location server in a core network, a list of associated transmission and reception points (TRPs) that transmit signals to a same communication node or that receive signals from the same communication node. In some embodiments, the positioning signals include sounding reference signals (SRSs), positioning reference signals (PRSs), channel state information reference signals (CSI-RSs), phase tracking reference signals (PT-RSs), or tracking reference signals (TRSs), and the set of timing delays are determined using the positioning signals. In some embodiments, the communication node includes a user equipment (UE) or a location server in a core network.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
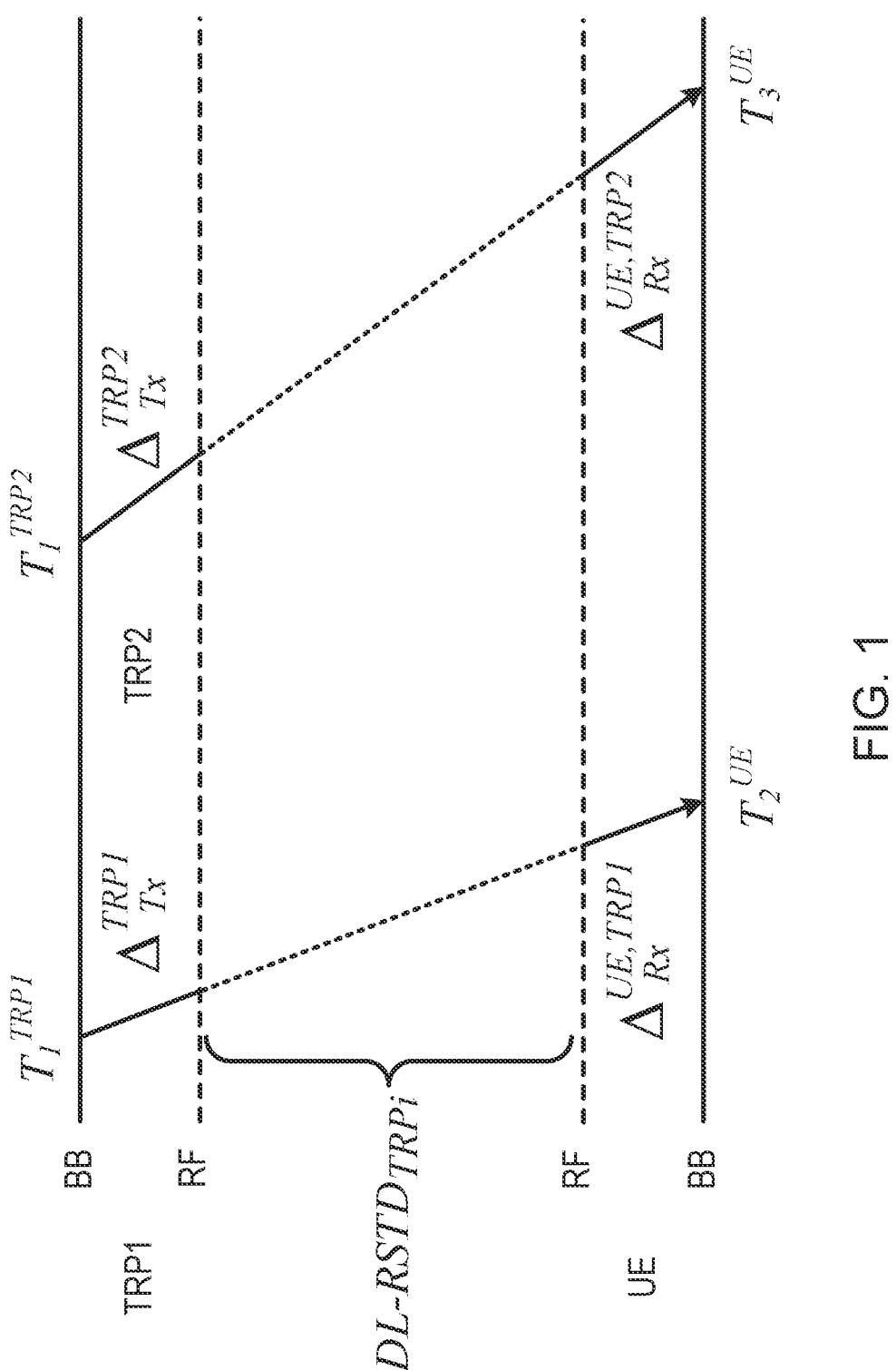
FIG. 1 shows a downlink time difference of arrival (DL-TDOA) procedure for two transmission/reception points (TRPs) and a user equipment (UE).

In New Radio (NR), positioning techniques can provide UE the precise location information. In timing-based positioning methods, such as downlink (DL) or uplink (UL) time difference of arrival (TDOA) method and/or multi round trip time (multi-RTT) method, there are timing delays or timing errors between the baseband device and antenna both at transmission/reception point (TRP) and UE side, which perturb or affect the measurement results in timing-based positioning method and should be measured and/or cancelled so that a greater measurement accuracy can be acquired. The patent document provides several technical solutions for timing-based positioning method when the timing delays exist, including measuring and reporting timing errors.

The Rx/Tx timing delay between baseband device and RF chains may be embedded in the timing measurement, since the time point is recorded at baseband device while the time duration to be measured for positioning, i.e., propagating time, is cut off at the antenna side both in TRP and UE. The timing delay can also be timing error, transmission delay, transmission error, group delay, or group error. TRP can be a gNB or a base station. The RF chains may include antennas, or physical transmission channel.

The example headings for the various sections for embodiments below are used to facilitate the understanding of the disclosed subject matter and do not limit the scope of the claimed subject matter in any way. Accordingly, one or more features of one example section (or one embodiment) can be combined with one or more features of another example section (or another embodiment). Furthermore, 5G terminology is used for the sake of clarity of explanation, but the techniques disclosed in the present document are not limited to 5G technology only, and may be used in wireless systems that implemented other protocols.

Embodiment 1

UE can perform self-calibration in the UL time gap, where the UL time gap (or UL gap) is a time duration that can be configured by gNB or the core network. The UL gap may be configured in a semi-static way or in a dynamic way. The configuration information may be indicated by gNB, the location server core network or the network, comprising that the length of UL gap, the repetition periodicity of UL gap, the time offset of UL gap, the activate/inactivate switch of TL gap, the timing advance of UL gap and so on. The UL gap can also be a request of UE. For example, if UE want to perform self-calibration, UE send a request to gNB asking for a UL gap. The positioning signal configured in UL gap is used for UE self-calibration. The positioning signal can be positioning reference signal (PRS), CSI-RS, PT-RS, tracking reference signal (TRS) or sounding reference signal (SRS). In the UL gap, UE may not transmit or receive signals except for performing self-calibration.

In some embodiments, UE can perform self-calibration using a specific SRS during the IL time gap. The usage of positioning SRS is configured in RRC signaling. The self-calibration SRS can have a larger bandwidth than the active bandwidth part (BWP). In some embodiments, the bandwidth of the self-calibration SRS can be the whole band.

Embodiment 2

The DL-TDOA method with the timing error $\Delta$ is explained in FIG. 1. T1 to T3 are the known time point measured at baseband device side both in TRP1 and UE while $\Delta$ exists as the unknown Rx-Tx timing error at TRP1, TRP2, and UE side. At the UE side, a baseband device may include a processor. The two instances of RE include antennas at the TRP side and HE side. Assuming that TRP1 and TRP2 are synchronized accurately, the propagating time downlink reference signal time difference (DL-RSTD$_{TRPi}$) between TRPi and UE is:

$$DL - RSTD_{TRPi} = \left(T_3^{UE} - T_1^{TRPi} - \Delta_{Tx}^{TRPi} - \Delta_{Rx}^{UE,TRPi}\right) - \quad \text{Equation (1)}$$

$$\left(T_2^{UE} - T_1^{TRP1} - \Delta_{Tx}^{TRP1} - \Delta_{Rx}^{UE,TRP1}\right)$$

where i is greater than one.

Equation (1) can be written as:

$$DL - RSTD_{TRPi} = \left(T_3^{UE} - T_2^{UE}\right) - \quad \text{Equation (2)}$$

$$\left(T_1^{TRPi} - T_1^{TRP1}\right) - \left(\Delta_{Tx}^{TRPi} - \Delta_{Tx}^{TRP1}\right) - \left(\Delta_{Rx}^{UE,TRPi} - \Delta_{Rx}^{UE,TRP1}\right)$$

where the third item $$\left(\Delta_{Tx}^{TRPi} - \Delta_{Tx}^{TRP1}\right)$$

indicates the transmitting timing error difference between TRPs, and the forth item $$\left(\Delta_{Rx}^{UE,TRPi} - \Delta_{Rx}^{UE,TRP1}\right)$$

indicates the receiving timing error difference when the UE receives PRS from different TRPs. If TRPs can perform mutual calibration, the third item can be a known constant or 0 determined by implementation, e.g., other TRPs can pre-compensate the timing error by sending positioning signals a little bit earlier or later to be align with the reference TRP. The TRPs can perform mutual calibration so that the relationship between $$\Delta_{Rx}^{UE,TRP2}$$

and $$\Delta_{Rx}^{UE,TRP1}$$

(e.g., both are a same value or a difference between both delta values) can be known to both the TRPs. Furthermore, the forth item can be 0 if UE uses the same RF chain (or same set of one or more RF devices) to receive positioning signals from different TRPs.

Figure 2:
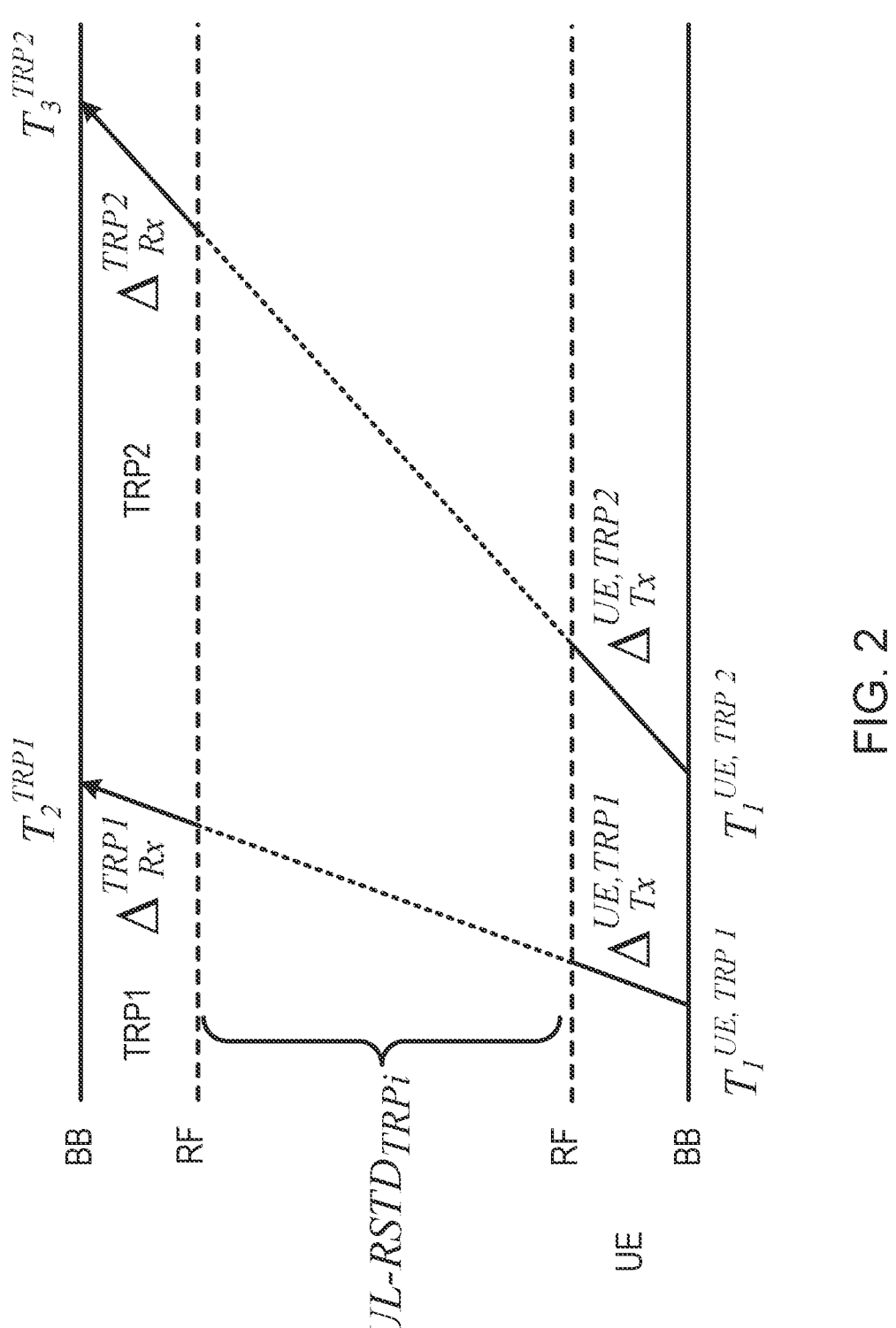
FIG. 2 shows an uplink TDOA (UL-TDOA) for two TRPs and a UE.

The UL-TDOA method with the timing error $\Delta$ is explained in FIG. 2. T1~T3 are the known time point measured at baseband device side both in TRP1 and UE while $\Delta$ exists as the unknown Rx-Tx timing error at TRPi and UE side. The propagating time uplink reference signal time difference (DL-RSTD$_{TRPi}$) between TRPi and UE is:

$$UL - RSTD_{TRPi} = \left(T_3^{TRPi} - T_1^{UE,TRPi} - \Delta_{Rx}^{TRPi} - \Delta_{Tx}^{UE,TRPi}\right) - \quad \text{Eqn. (3)}$$

$$\left(T_2^{TRP1} - T_1^{UE,TRP1} - \Delta_{Rx}^{TRP1} - \Delta_{Tx}^{UE,TRP1}\right)$$

Equation (3) can be written as:

$$UL - RSTD_{TRPi} = \left(T_3^{TRPi} - T_2^{TRP1}\right) - \quad \text{Eqn. (4)}$$

$$\left(T_1^{UE,TRPi} - T_1^{UE,TRP1}\right) - \left(\Delta_{Rx}^{TRPi} - \Delta_{Rx}^{TRP1}\right) - \left(\Delta_{Tx}^{UE,TRPi} - \Delta_{Tx}^{UE,TRP1}\right)$$

where the third item $$\left(\Delta_{Rx}^{TRPi} - \Delta_{Rx}^{TRP1}\right)$$

indicates the receiving timing error difference between TRPs, and the forth item $$\left(\Delta_{Tx}^{UE,TRPi} - \Delta_{Tx}^{UE,TRP1}\right)$$

indicates the transmitting timing error difference when the UE sends positioning signal like SRS to different TRPs. If TRPs can do the mutual-calibration, the third item can be a known constant determined by implementation. Furthermore, the forth item can be 0 if UE uses the same RF chain to transmit positioning signal like SRS to different TRPs.

If TRP can do the mutual-calibration and UE uses the same RF chain to receive or transmit positioning signals with different TRPs, the DL-TDOA/UL-TDOA scheme is able to cancel the Tx-Rx timing errors and improve the measurement accuracy.

In DL/UP-TDOA, after the measurement by implementation, for network-based positioning, TRPs can report the Tx-Tx timing error difference $$\Delta_{Tx}^{UE,TRPi} - \Delta_{Tx}^{UE,TRP1}$$

in UL-TDOA of associated TRPs, or Rx-Rx timing error difference $$\Delta_{Rx}^{TRPi} - \Delta_{Rx}^{TRP1}$$

in DL-TDOA of associated TRPs to the location server in the core network. The location server can be Enhanced Serving Mobile Location Centre (E-SMLC), Secure User Plane Location (SUPL), SUPL Location Platform (SLP), or Location Management Function (LMF). In some embodiments, each of the TRPs can report a single value that describes a difference of the two delta values (e.g., $$\left(\Delta_{Tx}^{UE,TRPi} - \Delta_{Tx}^{UE,TRP1}\right)$$

or $$\left(\Delta_{Rx}^{TRPi} - \Delta_{Rx}^{TRP1}\right)\!).$$

Or, the reference TRP reports the timing error difference with other interacted TRPs. For UE based-positioning, the Tx-Tx timing error difference $$\Delta_{Tx}^{UE,TRPi} - \Delta_{Tx}^{UE,TRP1}$$

in UL-TDOA of associated TRPs, or Rx-Rx timing error difference $$\Delta_{Rx}^{TRPi} - \Delta_{Rx}^{UE,TRP1}$$

in DL-TDOA of associated TRPs can be indicated to UE through assistance data, or through the TRPs.

In DL/UL-TDOA, gNB can pre-compensate the timing errors by itself, by sending positioning signals a little bit earlier or later to be align with the reference TRP.

Embodiment 3

In DL-TDOA, associated TRPs are the several TRPs that transmit signal to a single UE to measure the DL propagating time for positioning; in UL-TDOA, the associated TRPs are the several TRPs that receive the signal from a specific UE to measure the UL propagating time for positioning. In some embodiments, the associated TRPs that can do the mutual-calibration can be indicated to UE In some embodiments, the associated TRPs can also be the TRPs that perform mutual-calibration in order to measure or cancel the timing errors.

In DL-TDOA, UE can receive positioning signals sent from the associated TRPs using the same RF chain. In UL-TDOA, UE can transmit positioning signals to the associated TRPs using the same RF chain.

Location server can send (e.g., directly or via a base station or TRP) assistance data to UE to indicate UE about the TRP location and so on to help UE perform positioning. In some embodiments, the associated TRPs can be indicated to UE by configuring the TRP identifier (ID) list in the assistance data, the list contains the associated TRP ID.

Alternatively, UE can report whether UE transmits or receives positioning signals using the same RF chain. In some embodiments UE can report to which TRPs the UE transmits to/receives from using a same RF chain. In some embodiments, UE can report the TRP IDs and/or the different parameters which can identify the TRPs.

Embodiment 4

Figure 3:
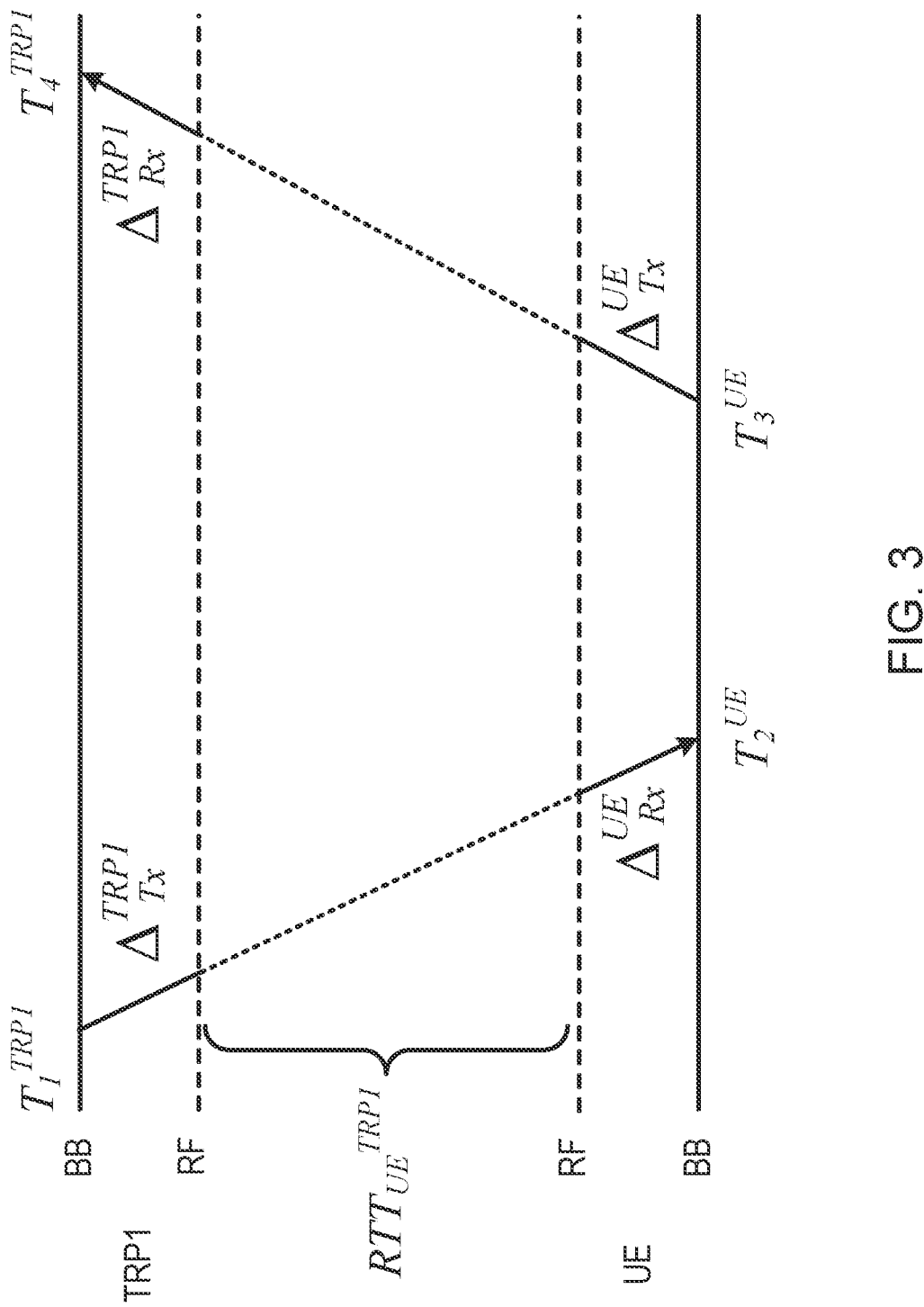
FIG. 3 shows a multi round trip time (multi-RTT) procedure between a single TRP and the UE.

FIG. 3 shows the multi-RTT procedure between a single TRP1, namely TRP1, and the UE. T1 to T4 are the known time point measured at baseband device side both in TRIP and UTE. Δ exists as the unknown Rx-Tx timing error at TRP1 and UE side. The dash line between the RE (e.g., antenna) of TRP1 and the RF (e.g., antenna) of UE indicates the real propagating time in the air between the antenna side of TRPs and UE. The propagating time $$RTT_{UE}^{TRPi}$$

is:

$$2 \times RTT_{UE}^{TRPi} =$$      Equation (5)

$$\left(T_4^{TRPi} - T_1^{TRPi} - \Delta_{Tx}^{TRPi} - \Delta_{Rx}^{TRPi}\right) - \left(T_3^{UE} - T_2^{UE} + \Delta_{Tx}^{UE} + \Delta_{Rx}^{UE}\right)$$

The Equation (5) can be written as:

$$RTT_{UE}^{TRPi} = \frac{1}{2}\left[\left(T_4^{TRPi} - T_1^{TRPi}\right) - \left(T_3^{UE} - T_2^{UE}\right)\right] - \frac{1}{2}\left(\Delta_{Tx}^{TRPi} + \Delta_{Rx}^{TRPi}\right) - \frac{1}{2}\left(\Delta_{Tx}^{UE} + \Delta_{Rx}^{UE}\right)$$    Equation (6)

where the third item $$\left(\Delta_{Tx}^{TRPi} + \Delta_{Rx}^{TRPi}\right)$$

is the Rx-Tx timing error sum of a single TRP, and the forth item $$\left(\Delta_{Tx}^{UE} + \Delta_{Rx}^{UE}\right)$$

is the Rx-Tx timing error sum of a UE. Self-calibration can be considered to measure the Rx-Tx timing error of TRPs and UE. One typical way of self-calibration is that, the self-transmitting/self-receiving timing error of a single antenna can be indirectly measured by sending signals to each other in turn through multiple antennas in the same remote radio unit (RRU). When self-calibration is performed, the last 2 items in equation (6) which perturb or affect the measurement results can be certain constants. Therefore, if both TRPs and UE have the capability of self-calibration, the multi-RTT scheme can have a higher measurement accuracy.

In the multi-RTT method, UE and TRPs can have the capability of self-calibration. In some embodiments for the multi-RTT method, gNB can report the Tx-Rx timing error sum $$\left(\Delta_{Tx}^{TRPi} + \Delta_{Rx}^{TRPi}\right)$$

and the measurement result $$\left(T_4^{TRPi} + T_1^{TRPi}\right)$$

to the location server, and UE can report the Tx-Rx timing error sum $$\left(\Delta_{Tx}^{UE} + \Delta_{Rx}^{UE}\right)$$

and the measurement result $$\left(T_3^{UE} + T_2^{UE}\right)$$

to the location server. In some embodiments, the gNB can report two values: one value for the Tx-Rx timing error sum $$\left(\Delta_{Tx}^{TRPi} + \Delta_{Rx}^{TRPi}\right)$$

and another value for the measurement result $$\left(T_4^{TRPi} + T_1^{TRPi}\right).$$

$$\left(\Delta_{Tx}^{UE} + \Delta_{Rx}^{UE}\right)$$

In some embodiments, the gNB can report three values: one value for the Tx-Rx timing error sum at UE side, UE may report $$\left(\Delta_{Tx}^{TRPi} + \Delta_{Rx}^{TRPi}\right),$$

$$a = \left(T_3^{UE} - T_2^{UE}\right) + \left(\Delta_{Tx}^{UE} + \Delta_{Rx}^{UE}\right)$$

another value for value to the location server; After the measurement of $$\left(T_4^{TRPi}\right)$$

$$\left(T_4^{TRPi} - T_1^{TRPi}\right)$$

and another value for and $$\left(T_1^{TRPi}\right).$$

$$\left(\Delta_{Tx}^{TRPi} + \Delta_{Rx}^{TRPi}\right),$$

The values gNB can report can be indicated in assistance data to UE in UE-based positioning, or report to the location server such as LMF in network-based positioning/UE-assist positioning. In some embodiments, the UE can report two values: one value for the Tx-Rx timing error sum TRP may report $$b = \left(T_4^{TRPi} - T_1^{TRPi}\right) - \left(\Delta_{Tx}^{TRPi} + \Delta_{Rx}^{TRPi}\right)$$

$$\left(\Delta_{Tx}^{UE} + \Delta_{Rx}^{UE}\right)$$

to the location server. Then the final and another value for the measurement result $$RTT_{UE}^{TRPi}$$

$$\left(T_3^{UE} + T_2^{UE}\right).$$

calculated at location server side is

In some embodiments, the UE can report three values: one value for the Tx-Rx timing error sum $$RTT_{UE}^{TRPi} = \frac{1}{2}(b - a).$$

$$\left(\Delta_{Tx}^{UE} + \Delta_{Rx}^{UE}\right)$$

In some embodiments, TRP and UE may indicate to the LMF whether the report is based on the measurement that has been calibrated. For example, TRP can indicate an information using a parameter to illustrate whether TRP report and another value for $$\left(\Delta_{Tx}^{TRPi} + \Delta_{Rx}^{TRPi}\right)$$

$$T_3^{UE}$$

or and yet another value for $$b = \left(T_4^{TRPi} - T_1^{TRPi}\right) - \left(\Delta_{Tx}^{TRPi} + \Delta_{Rx}^{TRPi}\right)$$

$$T_2^{UE}.$$

to the LMF. UE does the same. In some other embodiments, in UE-based positioning, UE may not need to report Alternatively, in network-based positioning, after the measurement of $$a = \left(T_3^{UE} - T_2^{UE}\right) + \left(\Delta_{Tx}^{UE} + \Delta_{Rx}^{UE}\right)$$

$$\left(T_3^{UE} - T_2^{UE}\right)$$

value to the location server, TRP can send and $$b = \left(T_4^{TRPi} - T_1^{TRPi}\right) - \left(\Delta_{Tx}^{TRPi} + \Delta_{Rx}^{TRPi}\right)$$

to the UE, and IE can calculate the final $$RTT_{UE}^{TRPi} = \frac{1}{2}(b - a).$$

In some embodiments, TRP may indicate to the UE whether the report is based on the measurement that has been calibrated. For example, TRIP can indicate an information using a parameter to illustrate whether TR-P report $$\left(\Delta_{Tx}^{TRPi} + \Delta_{Rx}^{TRPi}\right)$$

or $$b = \left(T_4^{TRPi} - T_1^{TRPi}\right) - \left(\Delta_{Tx}^{TRPi} + \Delta_{Rx}^{TRPi}\right)$$

to the UE. The parameter can be indicated in the assistance data, or in the higher layer signaling.

Embodiment 5

Mutual-calibration is an implementation method for measuring transmission or reception timing delay differences between several TRPs. If the timing delay relationship can be acquired, the errors can be aligned with the reference TR-P in order to cancel them in DL-TDOA or U-L-TDOA positioning methods.

Figure 4:
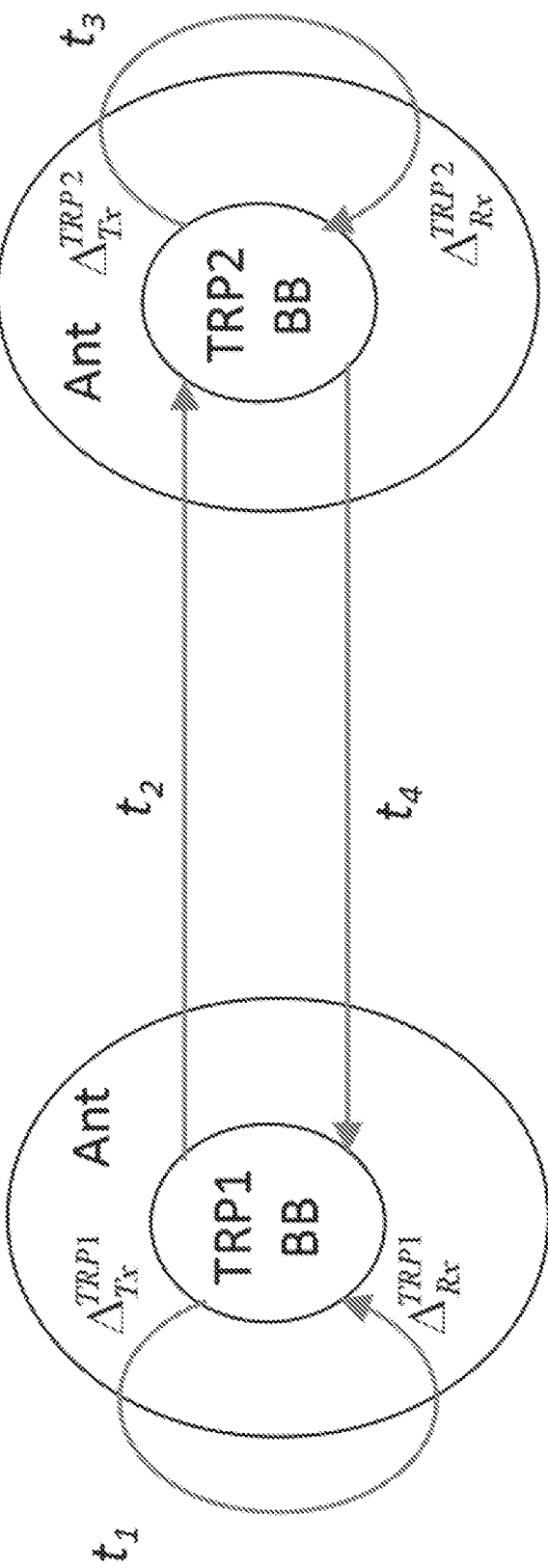
FIG. 4 shows an example of mutual-calibration for at least two TRPs.

FIG. 4 shows an example of mutual-calibration for at least two TRPs. As depicted in FIG. 4, taking 2 TRPs for example, the mutual-calibration procedure is as follows:
Measure the signal propagation time t1 by doing self-transmission and self-reception of TRP1, $$t_1 = \Delta_{Tx}^{TRP1} + \Delta_{Rx}^{TRP1};$$

Measure the signal propagation time t2 between TRP1 and TRP2, $$t_2 = \Delta_{Tx}^{TRP1} + T_h + \Delta_{Rx}^{TRP2},$$

wherein Th is the signal propagation time in the air;
Measure the signal propagation time t3 by doing self-transmission and self-reception of TRP2, $$t_3 = \Delta_{Tx}^{TRP2} + \Delta_{Rx}^{TRP2};$$

Measure the signal propagation time t4 between TRP2 and TRP1, $$t_4 = \Delta_{Tx}^{TRP2} + T_h + \Delta_{Rx}^{TRP1},$$

wherein Th is the signal propagation time in the air;

According to the former 4 steps, it can be calculated that $$\Delta_{Tx}^{TRP1} - \Delta_{Tx}^{TRP2} =$$

$$\frac{1}{2}[(t_4 - t_2) - (t_1 - t_3)] \text{ and } \Delta_{Rx}^{TRP1} - \Delta_{Rx}^{TRP2} = \frac{1}{2}[(t_4 - t_2) + (t_1 - t_3)].$$

It can be seen that the timing delay differences are calculated in step 5. Furthermore, if TRP1 is the reference TRP, then the TRP2 can set the transmission timing delays to align with timing delays of TRP1, which helps to cancel the timing delay embedded in DL/UL-TDOA positioning methods.

Figure 5:
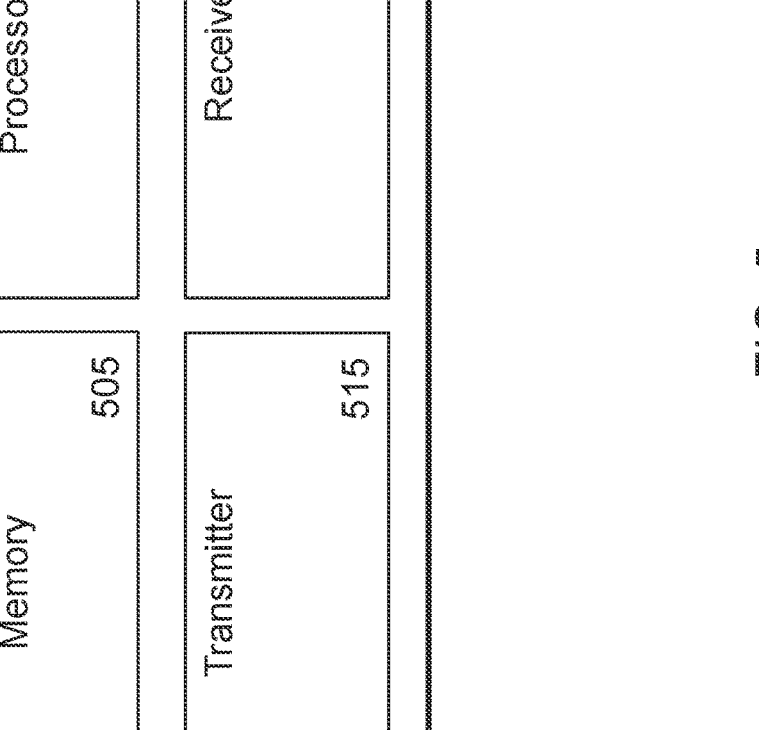
FIG. 5 shows an exemplary block diagram of a hardware platform that may be a part of a network node or a user equipment.

FIG. 5 shows an exemplary block diagram of a hardware platform 500 that may be a part of a network node (e.g., base station or TRP) or a communication node (e.g., user equipment). The hardware platform 500 includes at least one processor 510 and a memory 505 having instructions stored thereupon. The instructions upon execution by the processor 510 configure the hardware platform 500 to perform the operations described in FIGS. 1 to 4 and 6 to 7 and in the various embodiments described in this patent document. The transmitter 515 transmits or sends information or data to another node. For example, a network node transmitter can send a message to a communication node. The receiver 520 receives information or data transmitted or sent by another node. For example, a communication node can receive a message from a network node.

Figure 6:
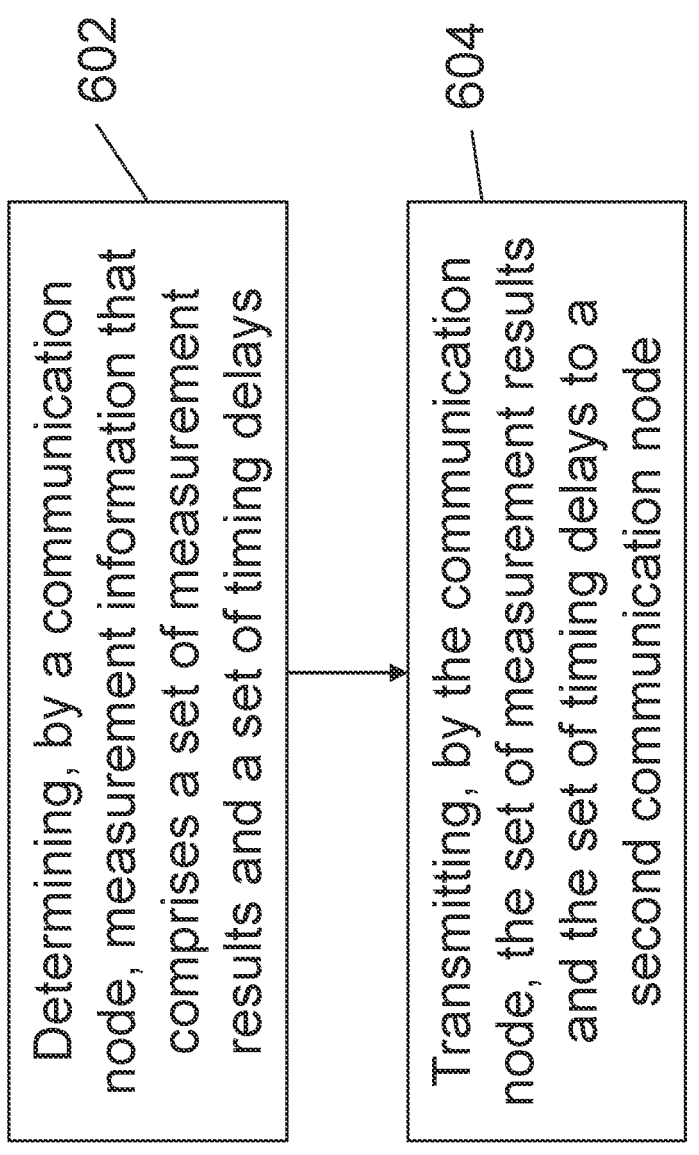
FIGS. 6 to 7 show two exemplary flowcharts for measuring and/or reporting timing errors.

FIG. 6 shows an exemplary flowchart for measuring and/or reporting timing errors. Operation 602 includes determining, by a communication node, measurement information that comprises a set of measurement results and a set of timing delays, wherein the set of measurement results include a first set of time values when positioning signals (which may also be known as reference signals) are sent or received by a processor of the communication node, and wherein the set of timing delays includes a second set of time values, each of the second set of time values is a difference between when a positioning signal is sent or received by the processor of the communication node and when the positioning signal is respectively transmitted or received by an antenna of the communication node. Operation 604 includes transmitting, by the communication node, the set of measurement results and the set of timing delays to a second communication node.

In some embodiments, the set of timing delays includes a sum of a first part and a second part, the first part is a difference between when a first positioning signal is sent by the processor of the communication node and when the first positioning signal is transmitted by the antenna of the communication node; and the second part is a difference between when a second positioning signal is received by the processor of the communication node and when the second positioning signal is received by the antenna of the communication node. In some embodiments, the set of timing delays are determined during a time duration when transmission or reception of signals are limited to transmission or reception of the positioning signals.

In some embodiments, the method further comprises receiving, by the communication node from the second communication node, a configuration information of time duration, wherein the configuration information comprises any one or more of a length, a periodicity, an offset, an activate or inactivate switch, and a timing advance. In some embodiments, the method further comprises receiving, by the communication node, a list of associated transmission and reception points (TRPs) that transmit signals to a same communication node or that receive signals from the same communication node. In some embodiments, the method further comprises reporting, by the communication node to the second communication node, a list of associated transmission and reception points (TRPs) that transmit signals to a same communication node or that receive signals from the same communication node.

In some embodiments, the list of associated TRPs is received by the communication node in assistance data sent by a location server in a core network. In some embodiments, the communication node performs communication with at least two associated TRPs from the list of associated TRPs by using a same physical transmission channel to transmit signals to or to receive signals from the at least two associated TRPs. In some embodiments, the positioning signals include sounding reference signals (SRSs), positioning reference signals (PRSs), channel state information reference signals (CSI-RSs), phase tracking reference signals (PT-RSs), or tracking reference signals (TRSs), and the set of timing delays are determined using the positioning signals. In some embodiments, the communication node includes a user equipment (UE), and wherein the second communication node includes a location server in a core network, a base station, or a transmission and reception point (TRP).

Figure 7:
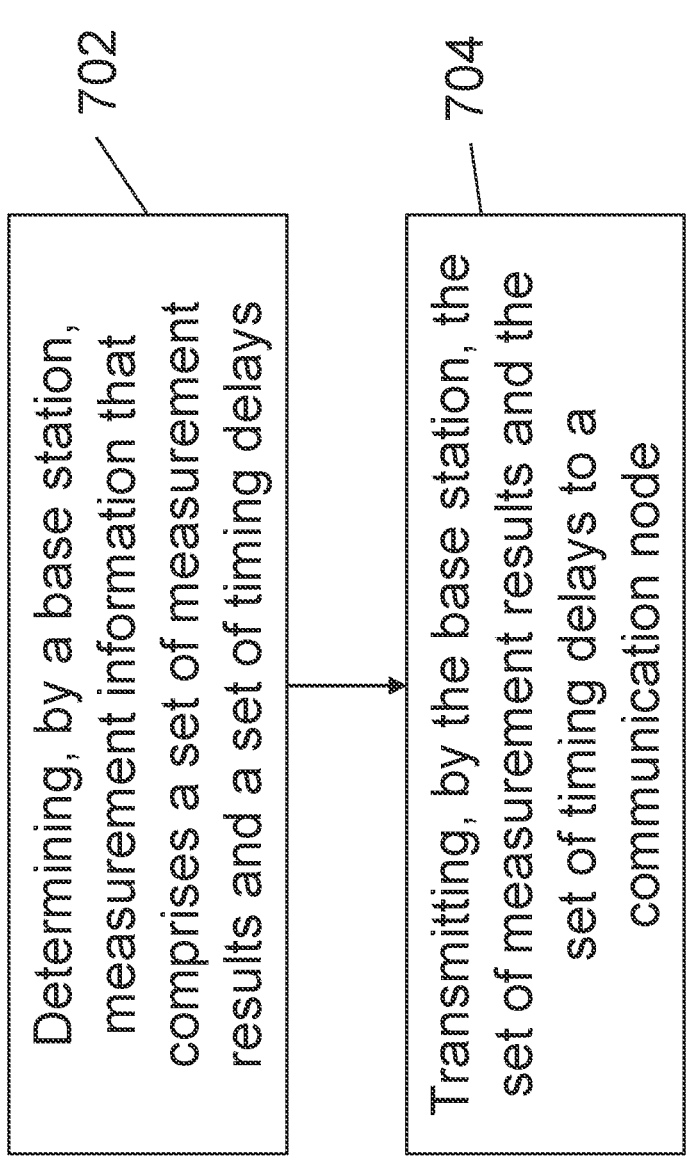

FIG. 7 shows another exemplary flowchart for measuring and/or reporting timing errors. Operation 702 includes determining, by a base station, measurement information that comprises a set of measurement results and a set of timing delays, wherein the set of measurement results include a first set of time values when positioning signals (which may also be known as reference signals) are sent or received by a processor of the base station, and wherein the set of timing delays includes a second set of time values, each of the second set of time values is a difference between when a positioning signal is sent or received by the processor of the base station and when the positioning signal is respectively transmitted or received by an antenna of the base station. Operation 704 includes transmitting, by the base station, the set of measurement results and the set of timing delays to a communication node.

In some embodiments, the set of timing delays includes a sum of a first part and a second part, the first part is a difference between when a first positioning signal is sent by the processor of the base station and when the first positioning signal is transmitted by the antenna of the base station, and the second part is a difference between when a second positioning signal is received by the processor of the base station and when the second positioning signal is received by the antenna of the base station. In some embodiments, the set of timing delays includes a difference of a first part and a second part, the first part is a difference between when a first positioning signal is sent by the processor of the base station and when the first positioning signal is sent by the antenna of the base station; and the second part is a difference between when a second positioning signal is sent by a processor of a second base station and when the second positioning signal is sent by an antenna of the second base station.

In some embodiments, the set of timing delays includes a difference of a first part and a second part, the first part is a difference between when a first positioning signal is received by the processor of the base station and when the first positioning signal is received by the antenna of the base station; and the second part is a difference between when a second positioning signal is received by a processor of a second base station and when the second positioning signal is received by an antenna of the second base station. In some embodiments, the set of timing delays are determined during a time duration when transmission or reception of signals are limited to transmission or reception of the positioning signals.

In some embodiments, the method further comprises transmitting, by the base station to the communication node, a list of associated transmission and reception points (TRPs) that transmit signals to a same communication node or that receive signals from the same communication node. In some embodiments, the list of associated TRPs is transmitted in assistance data sent by a location server in a core network. In some embodiments, the method further comprises receiving, by the base station from a communication node or a location server in a core network, a list of associated transmission and reception points (TRPs) that transmit signals to a same communication node or that receive signals from the same communication node. In some embodiments, the positioning signals include sounding reference signals (SRSs), positioning reference signals (PRSs), channel state information reference signals (CSI-RSs), phase tracking reference signals (PT-RSs), or tracking reference signals (TRSs), and the set of timing delays are determined using the positioning signals. In some embodiments, the communication node includes a user equipment (UE) or a location server in a core network.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A wireless communication method, comprising:

receiving, by a communication node, from a second communication node, a list of associated transmission and reception points (TRPs) that can perform mutual calibration with each other;

determining, by the communication node, measurement information that comprises a set of measurement results and a set of timing delays, wherein the set of measurement results include a first set of time values when positioning signals received or sent from the list of associated TRPs are sent or received by a processor of the communication node, and wherein the set of timing delays includes a second set of time values, each of the second set of time values is a difference between when a positioning signal received or sent from the list of associated TRPs is sent or received by the processor of the communication node and when the positioning signal is respectively transmitted or received by an antenna of the communication node; and transmitting, by the communication node, the set of measurement results and the set of timing delays to a second communication node.

2. The method of claim 1, wherein the set of timing delays includes a sum of a first part and a second part, wherein the first part is a difference between when a first positioning signal is transmitted by the antenna of the communication node and when the first positioning signal is sent by the processor of the communication node; and wherein the second part is a difference between when a second position-ing signal is received by the processor of the communication node and when the second positioning signal is received by the antenna of the communication node.

3. The method of claim 1, wherein the set of timing delays are determined during a time duration when transmission or reception of signals are limited to transmission or reception of the positioning signals.

4. The method of claim 3, further comprising: receiving, by the communication node from the second communication node, a configuration information of time duration, wherein the configuration information comprises any one or more of a length, a periodicity, an offset, an activate or inactivate switch, and a timing advance.

5. The method of claim 1, wherein the receiving the list of TRPs comprises:

receiving the list of associated TRPs in assistance data sent by a location server in a core network.

6. The method of claim 1, wherein the communication node performs communication with at least two associated TRPs from the list of associated TRPs by using a same physical transmission channel to transmit signals to or to receive signals from the at least two associated TRPs.

7. The method of claim 1, wherein the positioning signals include sounding reference signals (SRSs), positioning ref-erence signals (PRSs), channel state information reference signals (CSI-RSs), phase tracking reference signals (PT-RS), or tracking reference signals (TRSs), and wherein the set of timing delays are determined using the positioning signals.

8. The method of claim 1, wherein the communication node includes a user equipment (UE), and wherein the second communication node includes a location server in a core network, a base station, or a transmission and reception point (TRP).

9. A wireless communication method, comprising:

determining, by a base station, measurement information that comprises a set of measurement results and a set of timing delays, wherein the set of measurement results include a first set of time values when positioning signals received or sent by a list of associated TRPs that can perform mutual calibration with each other are sent or received by a processor of the base station, and wherein the set of timing delays includes a second set of time values, each of the second set of time values is a difference between when a positioning signal received or sent by a list of associated TRPs that can perform mutual calibration with each other is sent or received by the processor of the base station and when the positioning signal is respectively transmitted or received by an antenna of the base station; and transmitting, by the base station, the set of measurement results and the set of timing delays to a communication node.

10. The method of claim 9, wherein the set of timing delays includes a sum of a first part and a second part, wherein the first part is a difference between when a first positioning signal is transmitted by the antenna of the base station and when the first positioning signal is sent by the processor of the base station, and wherein the second part is a difference between when a second positioning signal is received by the processor of the base station and when the second positioning signal is received by the antenna of the base station.

11. The method of claim 9, wherein the set of timing delays includes a difference of a first part and a second part, wherein the first part is a difference between when a first positioning signal is sent by the processor of the base station and when the first positioning signal is sent by the antenna of the base station; and wherein the second part is a difference between when a second positioning signal is sent by a processor of a second base station and when the second positioning signal is sent by an antenna of the second base station.

12. The method of claim 9, wherein the set of timing delays includes a difference of a first part and a second part, wherein the first part is a difference between when a first positioning signal is received by the processor of the base station and when the first positioning signal is received by the antenna of the base station; and wherein the second part is a difference between when a second positioning signal is received by a processor of a second base station and when the second positioning signal is received by an antenna of the second base station.

13. The method of claim 9, wherein the set of timing delays are determined during a time duration when transmission or reception of signals are limited to transmission or reception of the positioning signals.

14. The method of claim 9, wherein the list of associated TRPs is transmitted in assistance data sent by a location server in a core network.

15. The method of claim 9, wherein the positioning signals include sounding reference signals (SRSs), positioning reference signals (PRSs), channel state information reference signals (CSI-RSs), phase tracking reference signals (PT-RSs), or tracking reference signals (TRSs), and wherein the set of timing delays are determined using the positioning signals.

16. The method of claim 9, wherein the communication node includes am a location server in a core network.

\* \* \* \* \*